Dec. 2, 1930.  C. W. VOGT  1,783,865
MACHINE FOR PROCESSING MATERIALS
Filed March 17, 1928   2 Sheets-Sheet 1
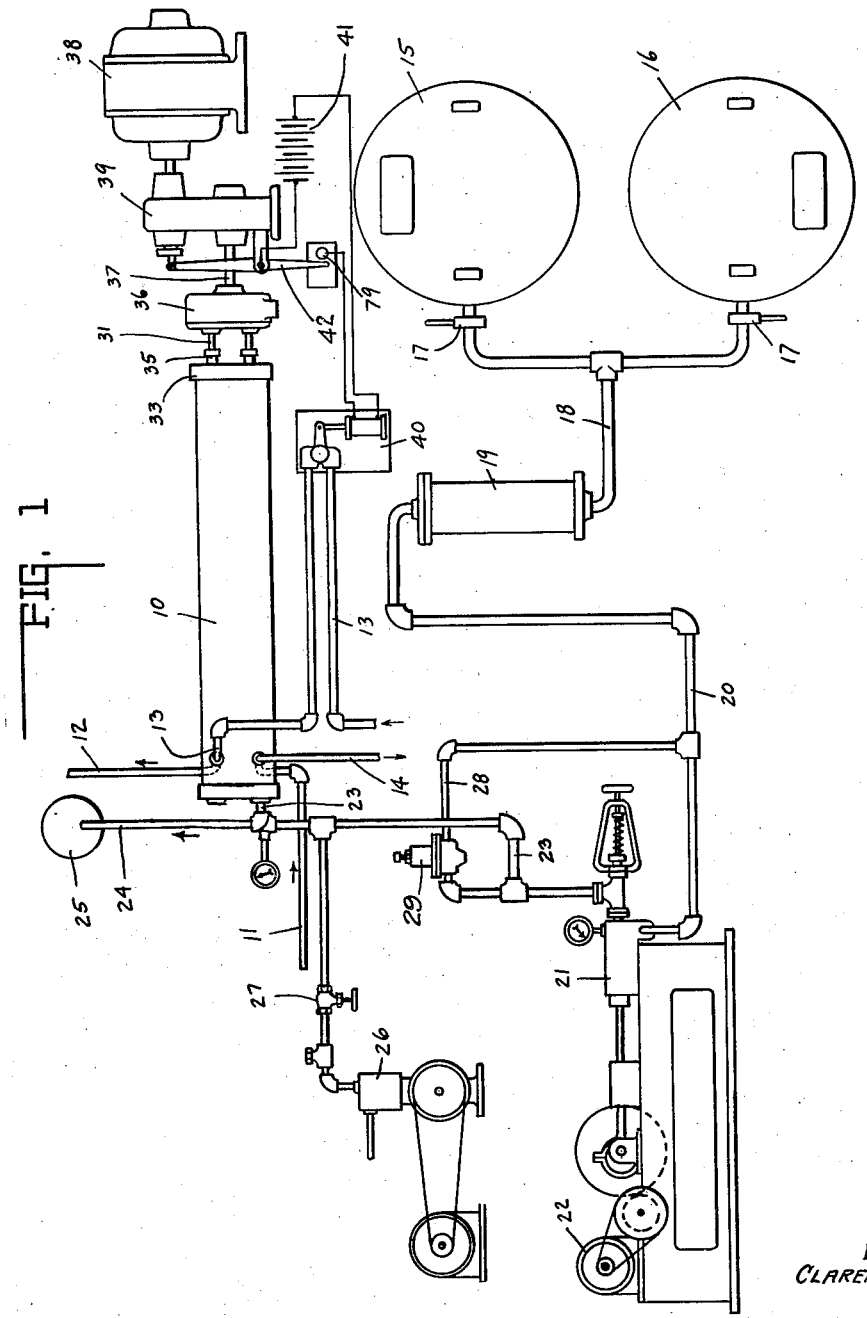
INVENTOR.
CLARENCE W. VOGT.
BY
ATTORNEYS.

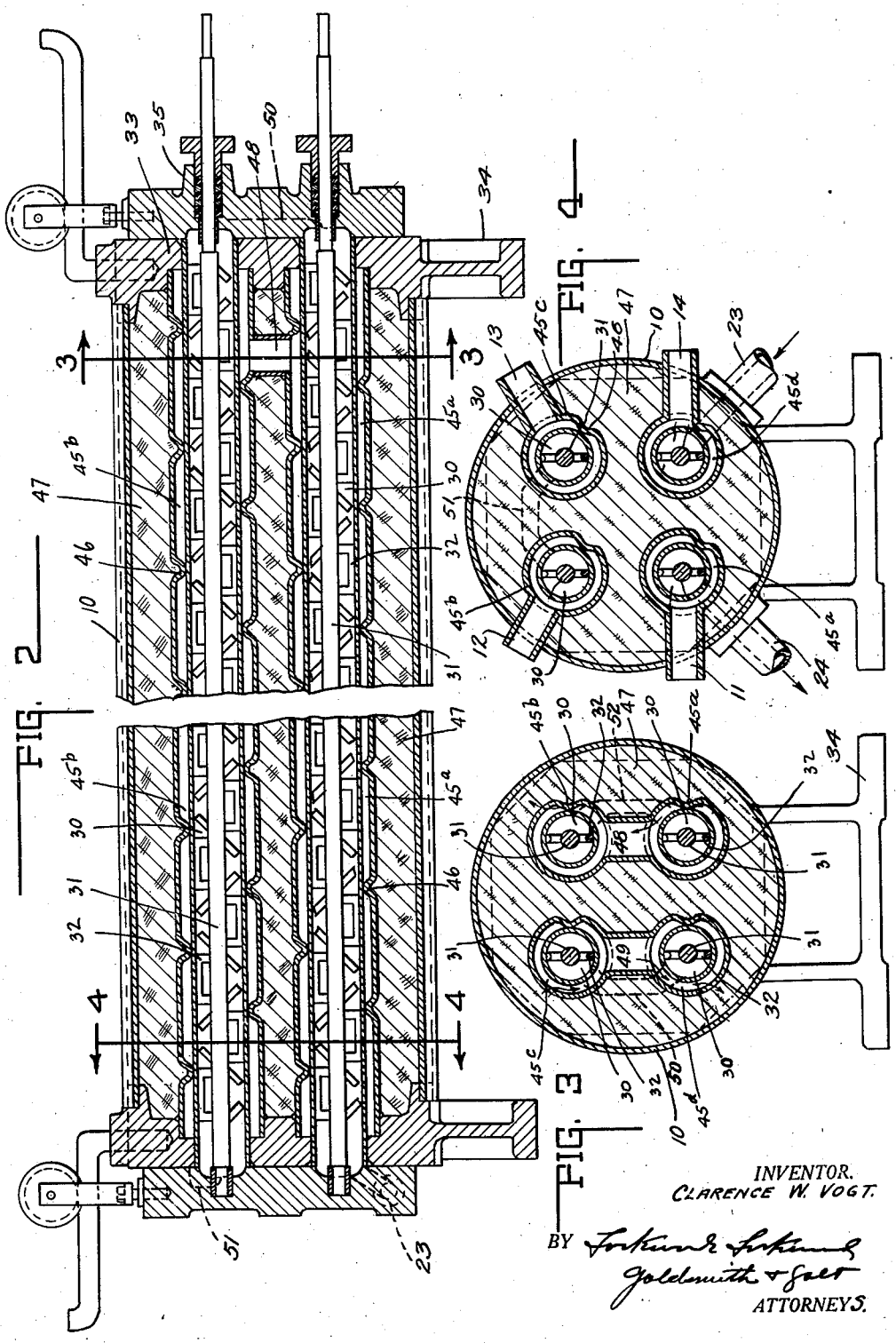

Patented Dec. 2, 1930

1,783,865

UNITED STATES PATENT OFFICE

CLARENCE W. VOGT, OF LOUISVILLE, KENTUCKY, ASSIGNOR TO VOGT INSTANT FREEZERS, INC., A CORPORATION OF DELAWARE

MACHINE FOR PROCESSING MATERIALS

Application filed March 17, 1928. Serial No. 262,339.

This invention relates to a processing machine, which is particularly adaptable for use as a continuous freezer for manufacturing ice cream, sherbet and the like, and also for the processing of vegetable and animal oils, and all other materials wherein it may be desirable to cool the same or change the temperature while being agitated or whipped.

The principal object of the invention is to provide a power operated machine of this character through which a material or mix may be continuously passed from one end to the other so as to be cooled or changed in temperature while being whipped or agitated. In respect to the manufacture of ice cream, this machine may be conveniently used by injecting the mix under pressure at one end with the proper quantity of fluid such as air, carbon dioxide, or the like to obtain the desired over-run by aeration, and forcing it under pressure while being frozen and whipped through the cooling or processing chamber. Wherein it is desired to employ the machine with respect to the manufacture of substitutes for lard, olemargarine and the like, it has the advantage of processing such material under pressure greater than the atmosphere so that by closing the fluid intake, the material may be processed without incorporating a fluid therein. In such material, it is highly advantageous by means of this machine to process the same under pressure greater than the atmospheric, whereby the crystallization takes place quickly in a uniform state caused by the beating or whipping of the material as it is cooled, and thus obtaining a smoother quality of product, eliminating therefrom hard or gritty particles heretofore created by the non-uniformity of the crystallization during the cooling process. The machine is also applicable to the processing of eggs, wherein it is desired to freeze the yolks and whites of the eggs after they are broken. By means of this machine, the eggs are frozen as they are stirred or mixed under greater than atmospheric pressure so that no air will be beaten into the product causing deterioration. Other materials of this character may likewise be processed with the same or similar advantages.

A further object of the invention is to so construct the apparatus as to comprise a plurality of tubular chambers of relatively small diameter, as distinguished from a single passage, through which the material is forced while being reduced in temperature and agitated. By reason of the length and number of chambers forming a tortuous passage through which the material is caused to travel, a substantial increase in production is obtained over a relatively short chamber by, reason of the processing being effected while the material travels at considerably greater velocity. Wherein the processing chamber is relatively short, the material must pass therethrough relatively slow to permit complete processing, but where the distance of travel is increased, the same processing is obtained upon material passing therethrough at a greater velocity.

A further principal object of the invention is to secure a greatly increased capacity and extremely rapid freezing in a simple and compact machine, economical to manufacture and easy to operate.

The full nature of the invention will be understood from the accompanying drawings and the following description and claims:

Figure 1 is a diagrammatical illustration of the machine. Fig. 2 is a vertical section through the processing chamber. Fig. 3 is a section taken on the line 3—3 of Fig. 2. Fig. 4 is a section taken on the line 4—4 of Fig. 2.

In the drawings there is shown a processing apparatus 10 having water intake pipe 11 and discharge pipe 12, a brine intake pipe 13 and brine return pipe 14. The material to be processed is initially contained in the tanks 15 and 16 so as to be alternately drawn therefrom through the valves 17 to the pipe 18, through the filter 19 and pipe 20 to the homogenizer or pump 21 driven in the usual manner by the motor 22. From the homogenizer or pump 21 the material is forced through the pipe 23 into one end of the processing apparatus 10, and after passing therethrough is discharged through the pipe 24 into a suitable container or receptacle 25.

Connected with the intake line 23, there is a fluid line for an aerating fluid such as air, carbon dioxide or the like, connected with the air pump 26 driven from a motor or other suitable source of power, the fluid line being controlled by the air valve 27 so that any desired amount of fluid may be forced into the processing apparatus for aerating the material. A by-pass line 28 is provided by-passing the main line 23 between the homogenizer or pump 21 and the chamber 10. Mounted in the by-pass line 28 there is a plasticity control valve 29 for controlling the plasticity of the material processed in a manner specifically described and claimed in copending application Serial No. 329,596, filed December 31, 1928.

The processing apparatus 10, as shown in Figs. 2 and 3, comprises a plurality of tubular passageways or chambers 30 through which agitating or whipping members extend which consist of shafts 31 having blades or paddles 32 mounted thereon. The tubular chambers 30 extend through an end header 33 which is supported by the base 34, and to which is secured the stuffing box header 35 through which the driving ends of the shafts 31 extend.

The shafts 31 of the agitating or whipping members are driven from suitable gears contained in the gear housing 36, said gears being driven by a common drive shaft 37. The shaft 37 is in turn driven by the electric motor 38 through a torque or resistance control contained in the housing 39, and specifically disclosed in the before-mentioned copending application Serial No. 329,596 and in copending application Serial No. 316,567, filed November 1, 1928. Mounted in the brine intake pipe 13, there is a solenoid control valve 40, the solenoid being connected in the circuit with a source of current 41, said circuit having a switch 79 therein controlled by the switch lever 42, which lever is actuated by the torque control mechanism as described in said first mentioned copending application.

In the processing apparatus 10, each of the chambers 30 is surrounded by a cooling chamber 45a, 45b, 45c or 45d, comprising substantially cylindrical tubes spaced from their respective tubular chambers 30 and surrounding the same. Said tubes have their inner surface provided with spirally formed corrugations 46 which abut the outer surface of the cooling chambers so as to direct the refrigerant or cooling medium passing through the cooling chambers in a swirling motion thereabout. Surrounding said cooling chambers there is provided the usual insulation 47.

As illustrated in Figs. 3 and 4, a cooling medium, which may be either in the form of water or brine, is introduced through pipe 11 to one end of the cooling chamber 45a, passing through substantially the length thereof and through the passage 48 to the cooling chamber 45c, and throughout the length thereof until it is discharged from the discharge outlet 12. Brine is passed through the brine inlet 13 to one end of the chamber 45d, through the passageway 49 to the cooling chamber 45a and out through the discharge outlet 14. Thus, the cooling medium is caused to pass back and forth through separate pairs of cooling chambers. This permits the use of water as a cooling medium for one pair of chambers and brine for the other pair where the material is such that it need not be cooled to a substantially low degree. For instance, in the processing of substitutes for lard, oleomargarine or the like, the material will be cooled from about 110° to 120° F. in liquid form to approximately 50 degrees F. in its plastic form. On the other hand, when ice cream or the like is processed or any other material which should be frozen, it may be necessary to use brine in both pairs of chambers since the liquid introduced is approximately 70 degrees F. and is discharged at approximately 20 degrees.

The material is caused to pass through all four of the processing tubular chambers 30 so that in effect the distance of travel of the material in the processing apparatus 10 will be approximately four times its length. The material is taken in through the pipe 23 and forced through the tubular chambers 30 surrounded by the cooling chamber 45d during which time it is agitated and whipped by the blades or paddles 32. When it reaches the opposite end thereof it will be cooled to approximately the water temperature and will pass through the passage 50 in the bearing head 35 to the upper passageway 30 surrounded by the cooling chamber 45c, and thence through the chamber 51 to the brine cooled passage 30 surrounded by the chamber 45b, and through the passageway 52 to the chamber 30 surrounded by the chamber 45a and thence through the discharge pipe 24 to the container 25.

Whereas the invention is herein illustrated as employing one pair of water cooled chambers and one pair of brine cooled chambers, the invention contemplates the use of any desired temperature changing medium or combinations thereof. In addition thereto, wherein desired, the cooling medium may be eliminated or cut off from one or more of the chambers so as to permit a whipping action after the material has been cooled and before it is discharged, such whipping action to be conducted free from further cooling or change of temperature by a suitable medium.

The invention claimed is:

1. A machine for processing materials, comprising a member having a plurality of individual tubular processing chambers positioned therein and extending parallel with each other through which the material is adapted to be continuously passed, means for forcing the material therethrough under pressure, means for controlling the temperature of said individual processing chambers, said chambers communicating with each other in series for causing the material to pass through each of said chambers during the processing thereof, rotatable whipping blades mounted in each of said chambers for whipping and agitating the material as its temperature is varied in passing therethrough, and a single drive for rotating said blades.

2. A machine for processing materials, comprising a member having a plurality of individual tubular processing chambers positioned therein and extending parallel with each other through which the material is adapted to be processed, said chambers communicating with each other in series to permit the continuous passage of material therethrough, and means for maintaining the temperature of one of said chambers at a different degree than the other chamber.

3. A machine for processing materials, comprising a member having a plurality of individual tubular processing chambers positioned therein and extending parallel with each other through which the material is adapted to be processed, said chambers communicating with each other in series to permit the continuous passage of material therethrough, a water cooling medium adapted to surround and cool one of said chambers and a refrigerant medium adapted to surround and cool the other chamber to a lower degree.

4. A machine for processing material including a plurality of separate tubes of comparatively small diameter connected together in series, beating means in said tubes including central blade supports forming therewith substantially annular passages and whipping blades extending substantially to the tube walls, means for effecting a rapid relative rotation of said beating means and said tubes, means for introducing a fluid to one of said passages, means separate from said beating means for forcing said material through said passages and along said beating means at a rapid rate, and means for changing the temperature of said material during its flow to such extent that it emerges in a plastic form.

5. A machine for processing material composed of a plurality of ingredients, including a plurality of separate tubes of comparatively small diameter mounted adjacent to each other and connected together in series, means for cooling said tubes, beating means in said tubes including central support members forming therewith substantially annular passages, means for rotating said beating means at a rapid rate, and means independent of said beating means for forcing said material through said passages and along said beating means at a rapid rate, whereby the ingredients of said material are effectively homogenized and solidified to a plastic condition during the continuous flow through and delivery from said passages.

6. A machine for processing material including a plurality of separate tubes of comparatively small diameter mounted in parallel arrangement and connected together in series, beating means in said tubes including central support members forming therewith substantially annular passages, means for rotating said beating means at a rapid rate, and means independent of said beating means for forcing said material and fluid through said passages and along said beating means at a rapid rate, whereby the flow of fluid along the upper sides of said passages is prevented and whereby the material and fluid are completely intermixed during the flow through said passages.

7. A machine for processing material including a plurality of separate tubes of comparatively small diameter connected together in series, beating means in said tubes including central support members forming therewith substantially annular passages, means for effecting a rapid relative rotation of said beating means and said tubes, means for introducing a fluid to one of said passages, means independent of said beating means for forcing said material through said passages and along said beating means at a rapid rate, and means for changing the temperature of the material during its flow, whereby the gravitational separation of the material and fluid in said passage is prevented, and whereby the material and fluid are completely intermixed during the flow.

8. A machine for processing material including a plurality of separate tubes of comparatively small diameter connected together in series, means encircling each of said tubes for changing the temperature thereof, a casing enclosing all of said tubes and said temperature changing means, beating means in said tubes including central support members forming therewith substantially annular passages, means for effecting a rapid relative rotation of said beating means and said tubes, means independent of said beating means for forcing said material through said passages and along said beating means at a rapid rate.

9. A machine for processing material including a plurality of separate tubes of comparatively small diameter, means connecting them together in series, beating means in said tubes including central support members forming therewith substantially annular passages, means for rotating said beating means at a rapid rate, and means for forcing said material and fluid through said passages and along said beating means.

10. A machine for processing material including a plurality of separate tubes of comparatively small diameter, means connecting them together in series, a separate jacket for temperature-changing medium encircling each tube, a casing enclosing all of said jackets, beating means in said tubes including central support members forming therewith substantially annular passages, means for rotating said beating means at a rapid rate, and means for forcing said material and fluid through said passages and along said beating means.

11. A machine for processing material including a plurality of separate tubes of comparatively small diameter connected together in series, beating means in said tubes, including central support members forming therewith substantially annular passages, means for effecting a rapid relative rotation of said beating means and said tubes, means independent of said beating means for forcing said material through said passages and along said beating means at a rapid rate, and means for introducing a fluid to one of said passages, whereby gravitational separation of the material and fluid in said passages is prevented, and whereby the material and fluid are complately intermixed during the flow.

In witness whereof, I have hereunto affixed my signature.

CLARENCE W. VOGT.